United States Patent
Lin et al.

(10) Patent No.: US 7,444,059 B2
(45) Date of Patent: Oct. 28, 2008

(54) DEVICE AND METHOD FOR GENERATING FEEDBACK SIGNAL

(75) Inventors: Meng-Yueh Lin, Tu-Cheng (TW);
Hung-Chang Lin, Tu-Cheng (TW);
Cheng-Hui Chen, Tu-Cheng (TW);
Han-Tzung Lin, Tu-Cheng (TW);
Jun-Ming Chen, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/594,490

(22) Filed: Nov. 8, 2006

(65) Prior Publication Data
US 2007/0280628 A1 Dec. 6, 2007

(30) Foreign Application Priority Data
Jun. 2, 2006 (TW) ............................. 95119615 A

(51) Int. Cl.
*G02B 6/00* (2006.01)

(52) U.S. Cl. ..................... 385/147; 385/15; 385/24; 386/46

(58) Field of Classification Search .............. 385/147, 385/15, 24; 386/46
See application file for complete search history.

(56) References Cited

U.S. PATENT DOCUMENTS 6,757,477 B1 6/2004 Asano et al.
2006/0168639 A1* 7/2006 Gan et al. ................. 725/135

OTHER PUBLICATIONS

Jian Xu, "Brief Introduction on IPTV Technology", Cable Television Technology, Nov. 25, 2005, p. 57-62, Issue 22, China.

* cited by examiner

*Primary Examiner*—Jennifer Doan
(74) *Attorney, Agent, or Firm*—Morris, Manning & Martin LLP; Tim Tingkang Xia

(57) ABSTRACT

A method for generating feedback signal in a device includes steps of receiving user input, and setting resolution of the device and media types of the television signals according to the user input; tuning a channel according to the user input to receive channel signals; decoding the channel signals; counting a period; detecting whether the device receives television signals; detecting whether an interrupt instruction is received if the device does not receive the television signals; generating a feedback signal according to the interrupt instruction if the interrupt instruction is received, and transmitting the feedback signal to a media server if the interrupt instruction is received.

18 Claims, 6 Drawing Sheets

DEVICE AND METHOD FOR GENERATING FEEDBACK SIGNAL

BACKGROUND

1. Field of the Invention

The invention relates to devices and methods for processing signals, and particularly to an electronic device and method for generating a feedback signal to service providers.

2. Related Art

With rapid development of communication technologies, set top boxes have become increasingly popular in the television (TV) industry, and interactions between a user and a service provider (SP) are ever increasing.

Typically, set top boxes are not able to report problems that may occur, directly to the SP in a timely fashion. In other circumstances, if the user decides to switch to another SP, the set top boxes cannot report the problems to the new SP, either.

Therefore, a heretofore unaddressed need exists in the industry to overcome the aforementioned deficiencies and inadequacies.

SUMMARY

An exemplary embodiment of the present invention provides a device in communication with a media server. The device includes a user interface, a channel management module, a decoding module, a signal detection module, a timer module, and a feedback-signal generation module. The user interface receives user input. The channel management module tunes a channel according to the user input. The decoding module decodes channel signals. The signal detection module detects whether the device receives television signals. The timer module generates interrupt instructions after one or more of a plurality of predetermined time periods are counted down and no television signal is being received. The feedback-signal generation module generates a feedback signal according to the interrupt instruction, and transmits the feedback signal to the media server.

An exemplary embodiment of the present invention provides a method for generating a feedback signal in an electronic device. The method includes steps of: receiving user input; tuning a channel according to the user input; decoding channel signals; counting a period; detecting whether the device receives television signals; detecting whether an interrupt instruction is received if the device does not receive the television signals; generating a feedback signal according to the interrupt instruction, and transmitting the feedback signal to a media server if the interrupt instruction is received.

Other advantages and novel features will become more apparent from the following detailed description of preferred embodiments when taken in conjunction with the accompanying drawings, in which:

DETAILED DESCRIPTION OF THE EMBODIMENTS

Figure 1:
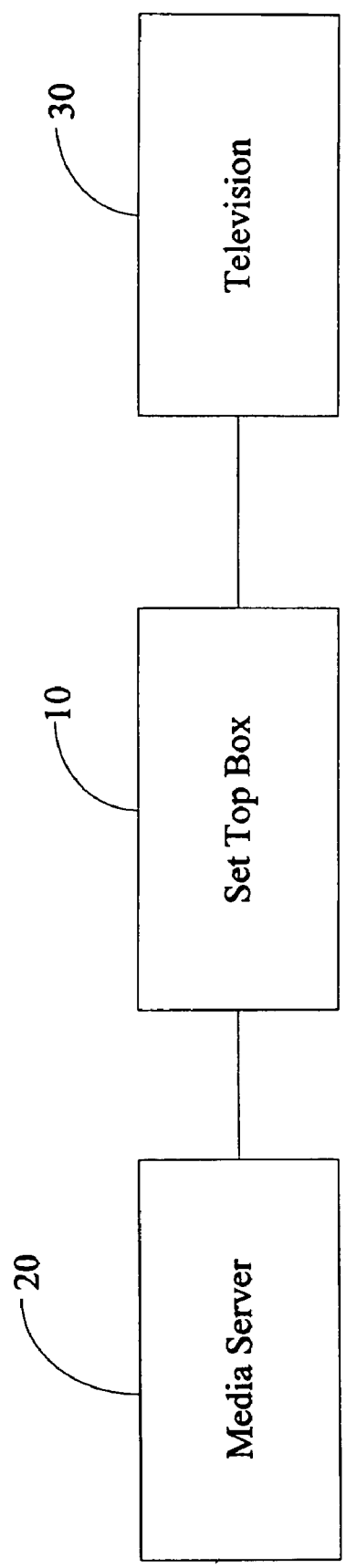
FIG. 1 is a schematic diagram illustrating an application environment of an exemplary embodiment of the present invention.

FIG. 1 is a schematic diagram illustrating an application environment of an exemplary embodiment of the present invention. A media server 20 transmits television signals to a television 30 via an electronic device 10. In an exemplary embodiment, the electronic device 10 is a set top box (STB) 10.

Figure 2:
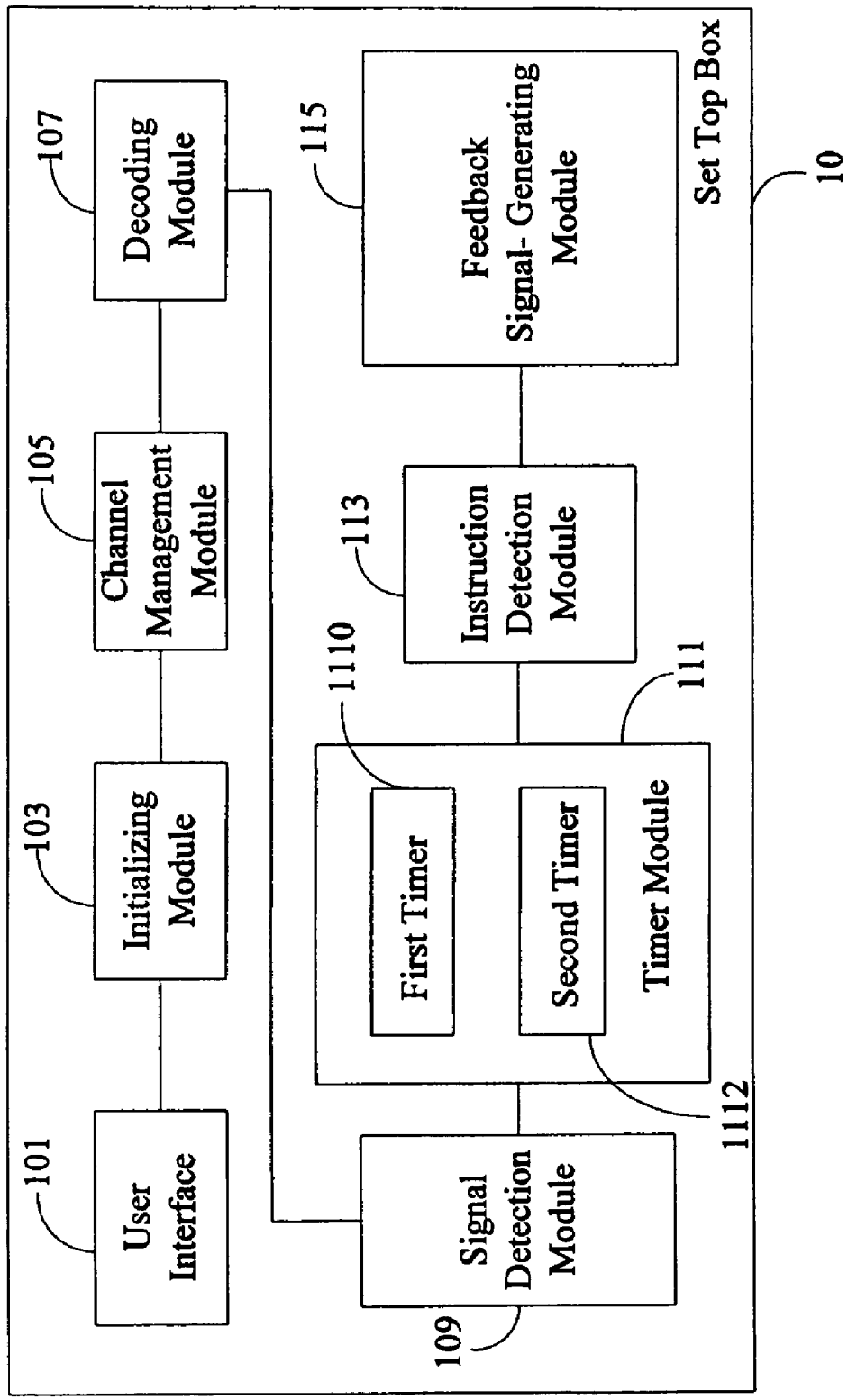
FIG. 2 is a block diagram of a set top box of the exemplary embodiment of the present invention.

FIG. 2 is a block diagram of the STB 10 of the exemplary embodiment of the present invention. The STB 10 includes a user interface 101, an initializing module 103, a channel management module 105, a decoding module 107, a signal detection module 109, a timer module 111, an instruction detection module 113, and a feedback-signal generation module 115.

The user interface 101 receives user input. In the exemplary embodiment, the user input includes power-on, channel selection, and exit to other function.

The initializing module 103 initializes the STB 10. In the exemplary embodiment, an initialization process includes setting media types of the television signal, resolution, and so on. The media types include moving picture expert group (MPEG), H.264, and so on.

The channel management module 105 enables the STB 10 to tune a channel according to the user input or to exit to another function of the STB 10. In this embodiment, the channel management module 105 is an Internet group management protocol (IGMP) management module.

The decoding module 107 decodes channel signals after the STB 10 has tuned in the channel if exit to another function has not been selected by a user. In the exemplary embodiment, the channel signals may be the television signals bearing television content or noise signals showing no content.

The signal detection module 109 detects whether the STB 10 receives the television signals.

In the exemplary embodiment, the timer module 111 includes a first timer 1110 and a second timer 1112. The timer module 111 generates one of three possible interrupt instructions IT1, IT2, IT3 after one of three predetermined detection periods elapses and no television signal is detected. In the exemplary embodiment, the predetermined detection periods include an initial detection period of six seconds occurring only at start up of the STB 10, a recurring short detection period also six seconds following the initial detection period, and a recurring long detection period of sixty seconds following the initial detection period. In the exemplary embodiment, the first timer 1110 counts both the initial detection period and the recurring short detection period, and the second timer 1112 counts the recurring long detection period.

The instruction detection module 113 detects the interrupt instructions generated by the timer module 111, and transmits a detection result to the feedback-signal generation module 115.

The feedback-signal generation module 115 generates feedback signals according to the detection result from the instruction detection module 113, and transmits the feedback signals to the media server 20.

In the exemplary embodiment, if the instruction detection module 113 detects IT1, then the feedback-signal generation module 115 generates a first feedback signal, and transmits the first feedback signal to the media server 20. In this embodiment, the first feedback signal indicates there is no television signal being received when the initial detection period ends.

If the instruction detection module 113 detects the IT2, the feedback-signal generation module 115 generates a second feedback signal, and transmits the second feedback signal to the media server 20. The second feedback signal indicates there is no television signal being received when one of the recurring short detection periods ends.

If the instruction detection module 113 detects the IT3, the feedback signal generates a third feedback signal, and transmits the third feedback signal to the media server 20. The third feedback signal indicates there is no television signal being received when one of the recurring long detection periods ends.

Figure 3:
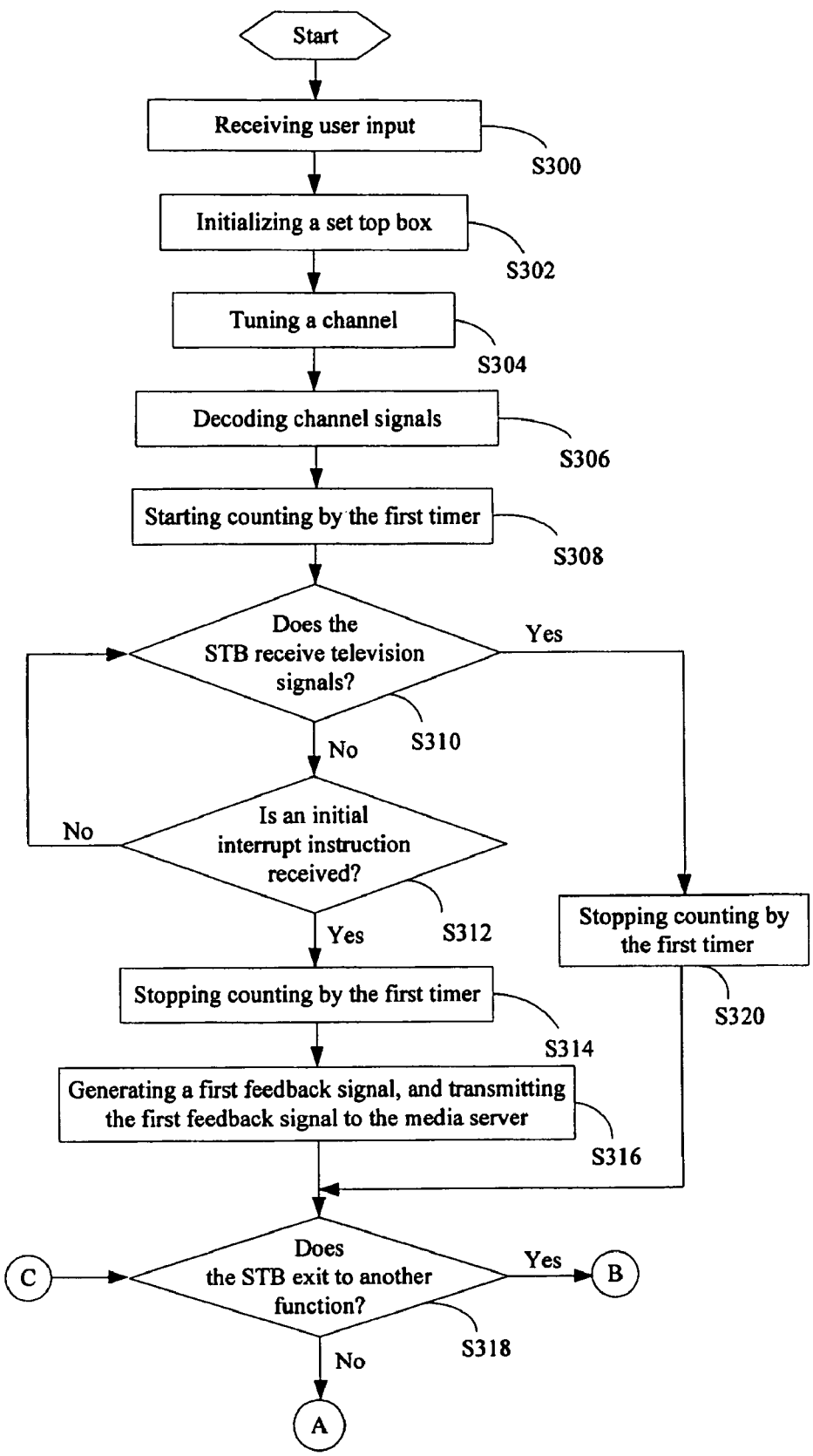
FIG. 3 is a flowchart of a method for generating a feedback signal of another exemplary embodiment of the present invention.

FIG. 3 is a flowchart of a method for generating a feedback signal of another exemplary embodiment of the present invention.

In step S300, the user interface 101 receives the user input. In the exemplary embodiment, the user input includes power-up, channel selection, and exit to another function.

In step S302, the initialization module 103 initializes the STB 10 according to the user input. In the exemplary embodiment, initial processes include setting media types of the television signals, resolution of the STB 10 according to the user input, and so on. The media types include moving picture expert group (MPEG), H..264, and so on.

In step S304, the STB 10 tunes in a television channel with the channel management module 105 according to the user input.

In step S306, the decoding module 107 decodes channel signals.

In step S308, the first timer 1110 starts counting the initial detection period. In the exemplary embodiment, the initial detection period is 6 seconds.

In step S310, the signal detection module 109 detects whether the STB 10 receives television signals. If yes, the process proceeds to step S320. If no, the process proceeds to step S312.

In step S312, the instruction detection module 113 detects whether the interrupt instruction IT1 is received. In the exemplary embodiment, the IT1 is generated by the first timer 1110 when the initial detection period ends and the television signals are not being received. If yes, the process proceeds to step S314. If not, the process returns to step S310.

In step S314, the first timer 1110 stops counting.

In step S316, the feedback-signal generation module 115 generates the first feedback signal corresponding to IT1 being detected by the instruction detection module 113, and transmits the first feedback signal to the media server 20. In the exemplary embodiment, the first feedback signal indicates there is no television signal being received when the initial detection period ends.

In step S318, the channel management module 105 detects whether the STB 10 should exit to another function. In the exemplary embodiment, the channel management module 105 detects whether the STB 10 should exit to another function by detecting whether the user interface 101 receives the exit to another function input.

In step S320, the first timer 1110 stops counting, then the process proceed to step S318.

Figure 4:
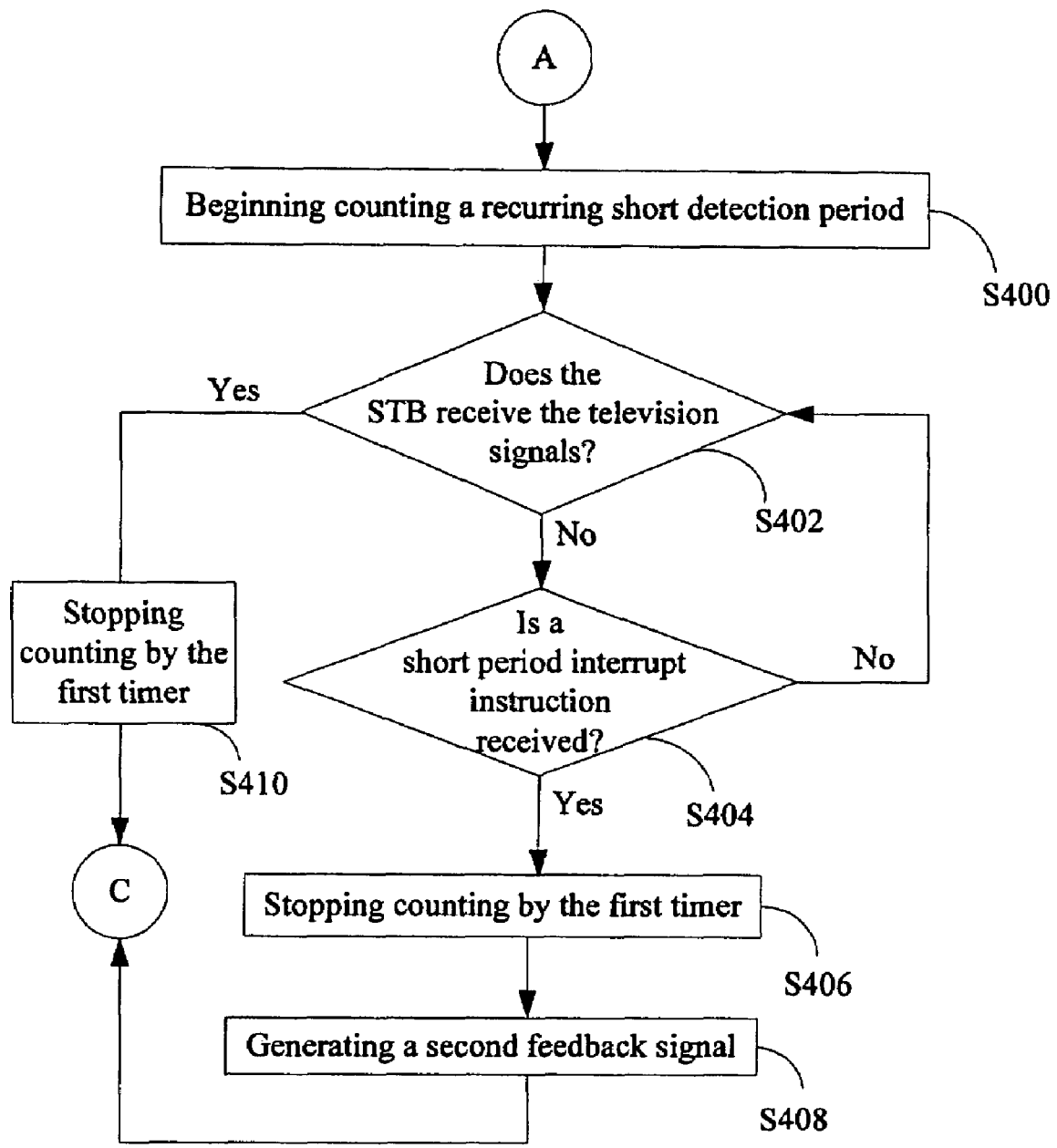
FIG. 4 is a flowchart of the method starting from a node A of FIG. 3.
Figure 5:
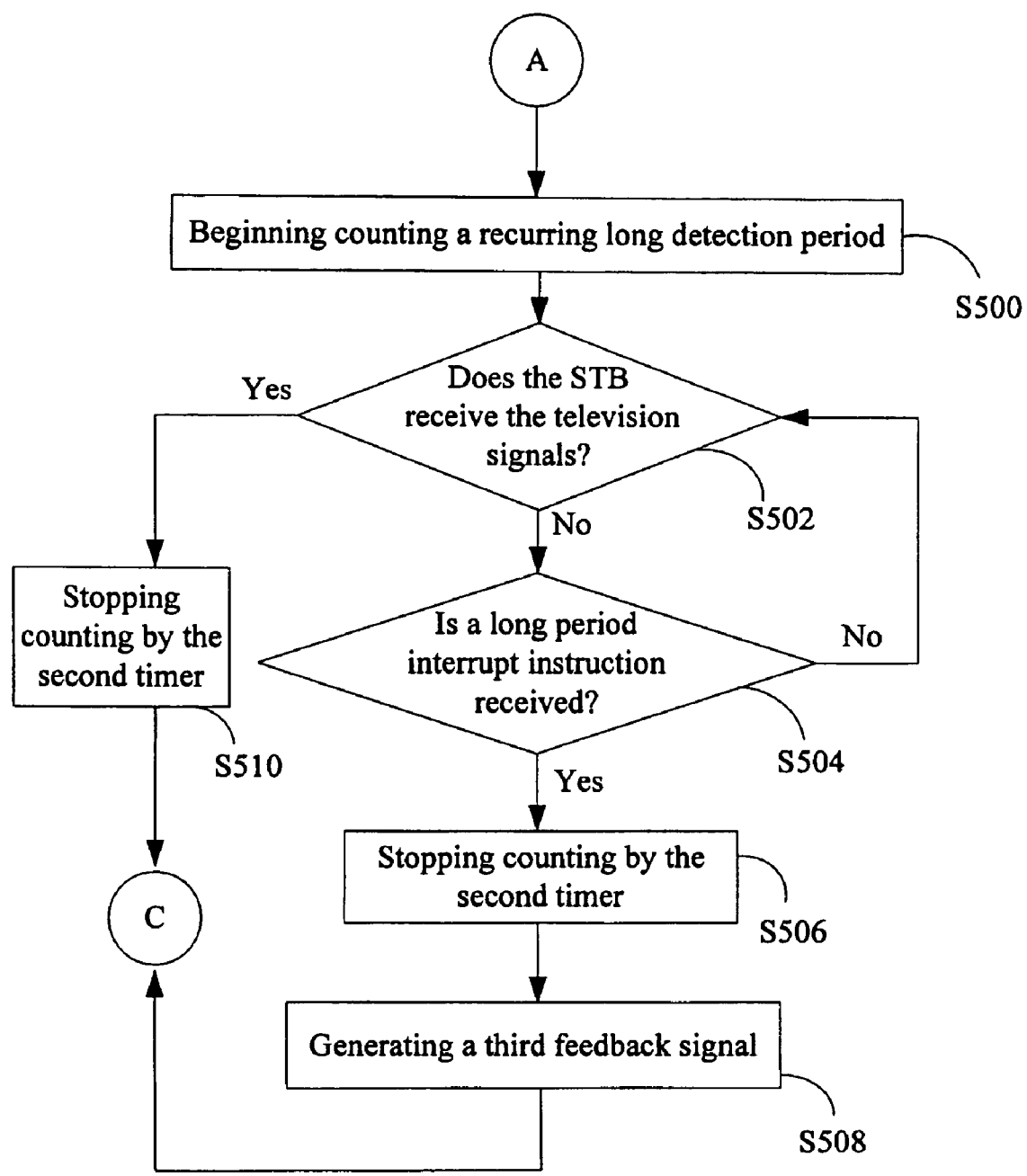
FIG. 5 is a flowchart of the method starting from the node A of FIG. 3.

If the STB 10 should not exit to another function, the process proceeds to a node A of FIG. 4 and FIG. 5.

Figure 6:
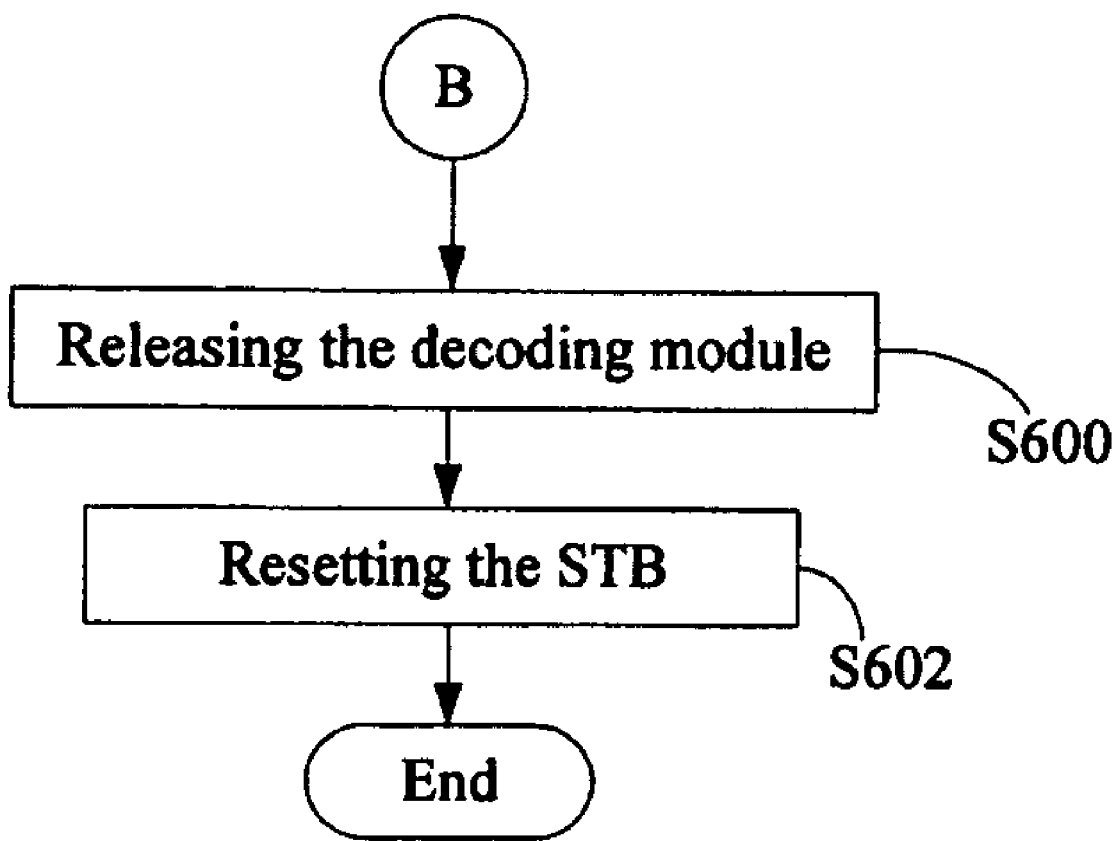
FIG. 6 is a flowchart of the method starting from a node B of FIG. 3.

If the STB 10 should exit to another function, the process proceeds to a node B of FIG. 6.

FIG. 4 is a flowchart starting from the node A of FIG. 3.

In step S400, the first timer 1110 begins counting the recurring short detection period.

In step S402, the signal detection module 109 detects whether the STB 10 receives the television signals. In the exemplary embodiment, the signal detection module 109 detects whether the decoding module 107 is operating to detect whether the STB 10 receives the television signals. If the STB 10 does not receive the television signals, the process proceeds to step S404.

In step S404, the instruction detection module 113 detects whether the STB 10 receives the interrupt instruction IT2. If the STB 10 receives the IT2, the process proceeds to step S406. If the STB 10 does not receive the IT2, the process returns to step S402. In the exemplary embodiment, the interrupt instruction IT2 is generated by the first timer when the first timer and the second timer are enabled at the same time and the recurring short detection period ends.

In step S406, the first timer 1110 stops counting.

In step S408, the feedback-signal generation module 115 generates the second feedback signal according to the interrupt instruction IT2, and transmits the second feedback signal to the media server 20. In the exemplary embodiment, the second feedback signal indicates there is no television signal being received when one of the recurring short detection periods ends. Then the process proceeds to a node C, that is, the process proceeds to step S318.

In step 402, if the STB 10 receives the television signals, the process proceeds to step 410, the first timer 1110 stops counting. Then the process proceeds to the node C.

FIG. 5 is a flowchart starting from the node A of FIG. 3. Note that the steps S400 and S500 from the node A are performed simultaneously.

In step S500, the second timer 1112 counts the recurring long detection period while the first timer 1110 counts the recurring short detection period at the same time.

In step S502, the signal detection module 109 detects whether the STB 10 receives the television signals. If the STB 10 does not receive the television signals, the process proceeds to step S504. If the STB 10 receives the television signals, the process proceeds to step S510.

In step S504, the instruction detection module 113 detects whether the STB 10 receives the interrupt instruction IT3. If the STB 10 receives the IT3, the process proceeds to step S506. If the STB 10 does not receive the IT3, the process returns to step S502.

In step S506, the second timer 1112 stops counting.

In step S508, the feedback-signal generation module 115 generates the third feedback signal, and transmits the third feedback signal to the media server 20. The third feedback signal indicates there is no television signal being received when one of the recurring long detection periods ends. Then the process proceeds to the node C.

In step S510, the second timer 1112 stops counting. Then the process proceeds to the node C.

FIG. 6 is a flowchart starting from a node B of FIG. 3.

In step S600, the STB 10 releases the decoding module 107 after the STB 10 exits to another function.

In step S602, the initializing module 103 resets. In the exemplary embodiment, the step of resetting the STB 10 includes resetting to default configurations such as erasing the previous settings of the resolution of the STB 10 and the medium types of the television signals.

While embodiments and methods of the present invention have been described above, it should be understood that they have been presented by way of example only and not by way of limitation. Thus the breadth and scope of the present invention should not be limited by the above-described exemplary embodiments, but should be defined only of the following claims and their equivalents.

We claim:

1. A device for interacting with a media server, comprising:
   a user interface for receiving user input;
   a channel management module for tuning a channel according to the user input;
   a decoding module for decoding channel signals;
   a signal detection module for detecting whether the device receives television signals;
   a timer module for generating interrupt instructions after one or more of a plurality of predetermined time periods are counted down and no television signal is being received, wherein the timer module comprises a first timer for counting two of the plurality of predetermined time periods comprising an initial period and a recurring short period, and generating a corresponding initial interrupt instruction or a short period interrupt instruction, and a second timer for counting one of the plurality of predetermined time periods comprising a recurring long period, and generating a corresponding long period interrupt instruction; and
   a feedback-signal generation module for generating a feedback signal according to the interrupt instruction, and transmitting the feedback signal to the media server.

2. The device claimed in claim 1, wherein the first timer generates the initial period interrupt instruction when the initial period ends and a television signal is not being received prior to the second timer being enabled.

3. The device as claimed in claim 2, wherein the first timer generates the short period interrupt instruction when one of the recurring short periods end concurrent with operation of the second timer.

4. The device as claimed in claim 1, wherein the second timer generates the long period interrupt instruction when the recurring long period ends concurrent with operation of the first timer.

5. The device as claimed in claim 1, further comprising an instruction detection module for detecting the interrupt instruction, and transmitting a detection result to the feedback-signal generation module.

6. The device as claimed in claim 1, further comprising an initializing module for initializing the device according to the user input.

7. The device as claimed in claim 1, wherein the device is a set top box.

8. A method for generating feedback signals in a device, comprising steps of:
   receiving user input, and setting resolution of the device and media types of the television signals according to the user input;
   tuning to a channel according to the user input to receive channel signals;
   decoding the channel signals;
   counting a period;
   detecting whether the device receives television signals;
   detecting whether an interrupt instruction is received if the device does not receive the television signals; and
   generating a feedback signal according to the interrupt instruction, and transmitting the feedback signal to a media server if the interrupt instruction is received.

9. The method as claimed in claim 8, wherein the user input further comprises initializing the device.

10. The method as claimed in claim 8, further comprising:
    enabling a first timer to count an initial period;
    detecting whether the device receives television signals;
    detecting whether an initial interrupt instruction is received, if the device does not receive the television signals; and
    generating a first feedback signals and transmitting the first feedback signal to the media server if the device receives the initial interrupt instruction.

11. The method as claimed in claim 10, wherein the initial interrupt instruction is generated by the first timer when the initial period ends.

12. The method as claimed in claim 11, furthering comprising detecting whether the device receives the television signals if the device does not receive the initial interrupt instruction.

13. The method as claimed in claim 12, furthering comprising:
    stopping counting of the first timer, if the device receives the television signals;
    detecting whether the device should exit to another function;
    enabling the first timer to count according to a recurring short period if the device should not exit the channel;
    detecting whether the device receives the television signals;
    detecting whether the device receives a short period interrupt instruction if the device does not receive the television signals;
    stopping counting of the first timer if the device receives the short period interrupt instruction; and
    generating a second feedback signal according to the short period interrupt instruction, and transmitting the second feedback signal to the media server.

14. The method as claimed in claim 13, further comprising stopping counting of the first timer if the device receives the television signals.

15. The method as claimed in claim 13, further comprising:
    enabling a second timer to count according to a recurring long period when the first timer is enabled;
    detecting whether the device receives the television signal;
    detecting whether the device receives a long period interrupt instruction if the device does not receive the television signal;
    stopping counting of the second timer, if the device receives the long period interrupt instruction; and
    generating a third feedback signal according to the long period interrupt instruction, and transmitting the third feedback signal to the media server.

16. The method as claimed in claim 15, wherein the short period interrupt instruction is generated by the first timer when the first timer and the second timer are enabled at the same time and the recurring short period ends; and the long period interrupt instruction is generated by the second timer when the first timer and the second timer are enabled at the same time and the recurring long period ends.

17. The method as claimed in claim 15, wherein the first feedback signal indicates there is no television signal being received when the initial period ends; the second feedback signal indicates there is no television signal being received when the recurring short period ends; and the third feedback signal indicates there is no television signal being received when the recurring long period ends.

18. A method for generating feedback signal in a device, comprising steps of:

tuning to a channel in a device to retrieve channel signals through said channel from a media server data-communicable with said device;
decoding said retrieved channel signals;
starting to count a time period in said device;
detecting whether said device retrieves television signals out of said decoded channel signals through said channel;

generating a feedback signal in said device when no television signal is retrieved in said device and said time period expires; and
transmitting said feedback signal from said device to said media server.

* * * * *